United States Patent [19]

Medney

[11] 4,415,613
[45] Nov. 15, 1983

[54] METHOD FOR MAKING STRENGTHENED POROUS PIPE AND RESULTING PRODUCT

[76] Inventor: Jonas Medney, 3504 Woodward St., Oceanside, N.Y. 11572

[21] Appl. No.: 295,640

[22] Filed: Aug. 24, 1981

[51] Int. Cl.³ .................................................. B32B 31/00
[52] U.S. Cl. ...................................... 428/36; 156/171; 156/172; 156/173; 156/175; 156/188; 156/279; 210/497.1; 210/499; 210/504; 210/506; 210/509
[58] Field of Search ................................. 156/171–173, 156/175, 177, 181, 195, 187–188, 184, 279; 210/497.1, 497.01, 503, 504, 509, 510, 494 R, 505, 506, 508, 509; 428/36

[56] References Cited

U.S. PATENT DOCUMENTS

| | | | |
|---|---|---|---|
| 2,677,466 | 5/1954 | Lowe | 210/504 X |
| 3,173,488 | 3/1965 | Rensvold | 210/504 X |
| 3,327,865 | 6/1967 | Thompson | 210/504 X |
| 3,601,156 | 8/1971 | Marks et al. | 156/177 X |
| 3,692,607 | 9/1972 | Shobert | 156/175 |
| 4,133,379 | 1/1979 | Nuyman et al. | 156/175 X |

Primary Examiner—David A. Simmons
Attorney, Agent, or Firm—Posnack, Roberts, Cohen & Spiecens

[57] ABSTRACT

For forming a perforated pipe a method is employed which includes winding on a mandrel having multiple spaced protrusions thereon angularly related strips arranged between the protrusions. These strips cooperatively define openings through which the protrusions extend. The strips are formed of fibres which are impregnated with a settable resin or plastic which combine with the fibres to form a tube adequate to resist a pressure of about 600 p.s.i. Because the protrusions are employed the fibres can be so impregnated as to be resin-rich. The openings may be screened with resin-poor granules arranged in vaulted configuration. A further strip may be wound around the foregoing arrangement to hold the granules against the resulting pipe.

14 Claims, 6 Drawing Figures

METHOD FOR MAKING STRENGTHENED POROUS PIPE AND RESULTING PRODUCT

FIELD OF INVENTION

This invention relates to methods for manufacturing resin bonded filament-wound pipes and the like and to products resulting from such methods.

BACKGROUND

As disclosed in U.S. Pat. No. 3,879,243, in the construction of water wells or waste wells, a pipe construction having a porous wall is normally used. The porous wall may be thought of as a screen which permits water to flow through the wall and which keeps sand and granular material out of the well. Wells must be developed in whatever soil is available and there is no control over the grain size of the soil that is adjacent the wall of the pipe or screen. Thus, it is necessary to use a very fine mesh screen having openings for example in the order of 0.006 inch. Even where such a small size screen is used, grain material that is smaller than the mesh will pass therethrough and harm both the flow of the well and equipment in the well.

In order to avoid the excesive costs of wire screening, it is known to cut slots, such as by sawing in the wall of a pipe. However, the wall is weakened as a result of the quantity of material that is removed. When glass fibres are used in the pipe, the slotting technique has an additional detrimental effect in that individual strands of the pipe that are wound continuously are cut so that, even in areas where material is not removed, the pipe is weakened.

A further method used in well preparation is the digging of a hole larger than the outside diameter of the pipe to be inserted therein, and packing gravel in the annular opening that is formed in order to insure that fine material is trapped in the gravel. Normally, the gravel consists of granules that are large enough not to enter the openings in the screen. Drawbacks to the gravel packing technique are that the gravel must frequently be shipped over large distances and excessive costs are incurred in packing the gravel into wells. Also, unless the gravel packing is done absolutely perfectly, there is always the possibility of collapse due to the weight of the gravel.

U.S. Pat. No. 3,601,159 discloses a porous tube, the wall of which consists of the combination of a porous paper strip and a layer of resin-impregnated glass fibres. The paper strip may be on the outside or the inside diameter of the pipe. In both embodiments the glass fibre rovings are furnished with just enough resin (i.e., resin starved) to hold the glass together without filling the interstices between rovings so that the resulting structure will be sufficiently permeable to allow the flow of water therethrough.

U.S. Pat. No. 3,879,243 provides a pipe having a porous, monolithic wall. Layers of resin bonded glass fibres are wound in a helical pattern on a mandrel together with a matrix material that is removable by application of heat, a solvent or a vacuum. After the resin is cured, appropriate means are used for the removal of the matrix material. The resulting structure is a pipe having a wall whose porosity is determined by the volume of the matrix material that is initially applied and subsequently removed.

Various other techniques have been tried which utilize resin bonded glass fibres but the use of resin starved glass fibres has been found essential to prevent blockage by the resin of the openings through which water is to pass. The use of resulting pipes, as well as of cement asbestos pipes which they have been intended to replace, has led to the occurrence of failure in deep wells where pressures may exceed, for example, 600 p.s.i. which is strong enough to make known types of pipes, otherwise suitable for this purpose, collapse.

SUMMARY OF INVENTION

It is an object of the invention to provide improved perforated pipes and improved methods for production of the same.

More specifically, it is an object of the invention to provide methods for the production of improved perforated pipes by the use of resin rich, rather than resin starved, glass fibres or the like, wherein the use of an abundance of resin or other such suitable material contributes greatly to the strength of the resulting product without interfering with the proper formation of openings which serve for the desired passage of fluid.

Yet another object of the invention is to provide for improved screen-type protection of the aforenoted openings and for shaping of the screening in a manner which adds to the effectiveness thereof.

To achieve the above and other objects of the invention there is provided a method of forming a perforated pipe which comprises winding on a mandrel having multiple spaced protrusions thereon fibres forming angularly related strips arranged between the said protrusions, said strips cooperatively defining openings through which said protrusions extend and impregnating said fibres with a settable plastic which combined with the fibres forms a tube adequate to resist an internal or external pressure in about the order of magnitude of 600 p.s.i. and upwards. The product which is formed thereby is, as indicated, a perforated pipe. It is especially strong since the pipe is formed of resin-rich fibres.

In the aforegoing the strips are preferably arranged in two sets, the strip of one set being angularly related to the strips of the other set. The aforesaid protrusions are preferably formed with a taper in order to permit, in certain embodiments, the ready withdrawal thereof. These protrusions are formed on a base which is fit against the above-mentioned mandrel which is preferably removable therefrom. The base may be made in the form of a tube which is placed over the mandrel but may preferably be made in the form of a sheeting which is wrapped around the mandrel. In other embodiments, the protrusions are retained in the pipe to be part thereof.

In accordance with a feature of the invention screening may be provided over the various openings. This screening in accordance with a preferred embodiment of the invention is preferably vaulted so as to present a maximum surface area to the fluid which will desirably enter the pipe through the openings therein. The screening is preferably formed of grains or granules which are stuck together with resin applied in an amount insufficient to fill the spaces between the grains, thereby providing of passages for the permeating fluid. The screening may also be formed in part or wholly of fibre glass screening or the like.

According to yet another feature of the invention the method thereof comprises coiling a further strip around the tube beneath the screening thereon to prevent the screening from passing through the openings. This further strip is formed of a resin-poor fibre in order to avoid obturating the openings which have been formed in the pipe. The pitch angle of the further strip may be substantially less than that of the first said strips.

The pipe which is formed by the aforegoing method constitutes another feature and aspect of the invention, said pipe being adapted to be substituted for cement asbestos pipes and fiber glass pipes heretofore available but incapable of withstanding the pressures which can be withstood by the construction of the invention.

Other objects, features and advantages of the invention will be apparent from the detailed description of a preferred embodiment as illustrated in the accompanying drawing.

DETAILED DESCRIPTION

Figure 1:
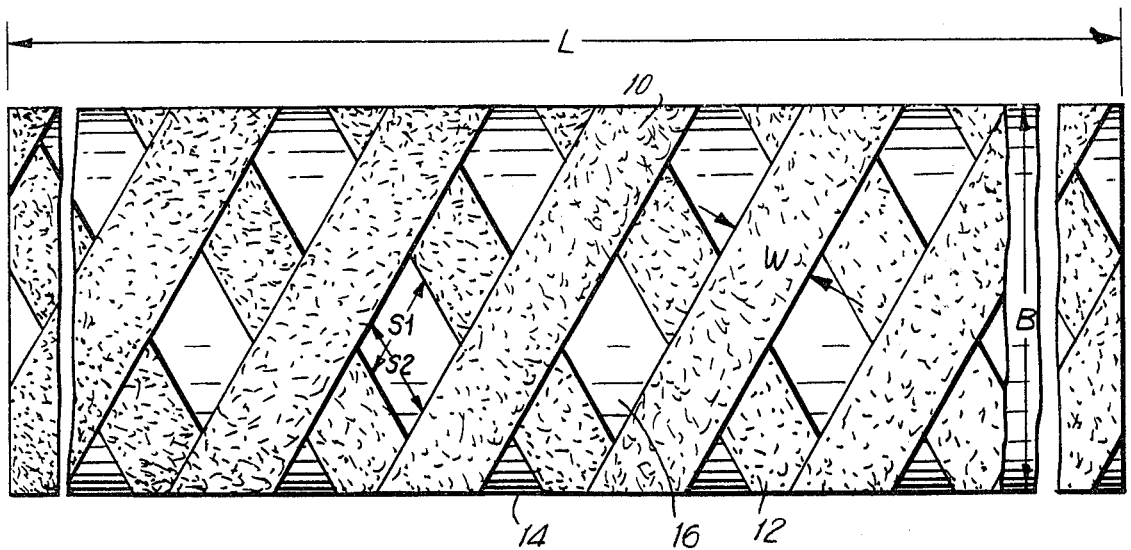
FIG. 1 diagrammatically illustrates a first phase of pipe preparation in accordance with one embodiment of the invention.

As has been implied above, it is known to form perforated tubing from resin impregnated fibre material and the like. Thus, for example, it is specifically known to wind filamentary material such as glass fibres and the like around a mandrel and to impregnate the filamentary material with a suitable resin which may be applied, for example, while the filamentary material is being wound on the mandrel. It is also known that a mandrel can be rotated about its longitudinal axis by conventional drive means such as a motor and a gear train with a source of filamentary material being arranged to apply bundles of filaments to the mandrel through a feed eye. Apparatus is well known in the filament winding art for this purpose and typically glass fibre bundles of about 250 yards per pound may be employed. The filaments may be passed through a resin bath or alternatively may be of the pre-impregnated type which is also well known in the art. A resin material such as epoxy has been found to be satisfactory with a complete cure being achieved with the application of 400° F. for 1½ hours. Other curing temperatures and curing times are also known. In addition to epoxy resin, it is also possible to use such bonding materials as polyester and vinyl esters. Other plastic materials such are known or are currently being developed.

The invention is based in part upon the utilization of resin-rich fibres as contrasted to the use of resin-poor or resin-starved fibres. A resin-starved fibre, as understood in the context of this disclosure, is intended to mean the use of sufficient resin to merely coat and bond the fiber glass or similar material referred to herein without contributing substantial strength thereto and more specifically is intended to mean an amount of resin in the order of 15–23 and preferably 18–19% by weight of resin to the total bonded fibres as discussed hereinunder. A resin-rich laminate or bonded fibre bundle is intended to mean a fibre bundle or laminate wherein the resin represents in the order of magnitude of 23–50% by weight of the total weight of the bundle or laminate and contributes substantial strength to the resulting product.

Heretofore in the formation of perforated pipe resin-poor or resin-starved fibre bundles have been employed. The reason for this is that the utilization of a greater amount of resin results in the obturaing of the openings formed in the pipe being manufactured thereby rendering such pipes non-functional for the purpose of the permeating of fluids therethrough. The use of resin-starved or resin-poor fibres, however, results in a relatively weak structure incapable of withstanding the pressures found in relatively deep wells. It is an object of the invention to cure this defect and enable the utilization of resin-bonded fibres in the formation of perforated pipes capable of being utilized in relatively deep wells and of withstanding pressures of the order of magnitude of at least about 600 p.s.i. This result is achieved while utilizing resin-rich fibre bundles while nevertheless preventing the obturating of the openings deliberately formed between angularly related strips constituted by the resin-bonded bundles.

In FIG. 1 is diagrammatically illustrated a perforated tube being wound of fibrous bundles on a mandrel which after the formation of the perforated pipe is removed. More particularly, there are illustrated fibrous bundles or strips 10 and 12 being oppositely convoluted on a mandrel 14 so as to form a multiple of openings 16 therein. It is to be emphasized that the drawing is not intended to illustrate relative or absolute dimensions but is intended merely to convey the idea of oppositely convoluted strips being wound on a mandrel to form a pipe with openings therein.

Each of the strips 10 and 12 is, in accordance with the invention, formed of resin rich fibre bundles and preferably bundles of fiber glass of the order of diameter of 0.0035 inches, impregnated with epoxy resin in such an amount as to gain the strength indicated above and more particularly wherein the epoxy constitutes 23–50% by weight of the impregnated fibre bundles.

The length of the pipe being formed may vary greatly. Length L is represented in FIG. 1, this length being, by way of example, in the order of magnitude of from 5–40 feet. The diameter of the pipe may also vary greatly. This diameter being represented in FIG. 1 at B, by way of example, varies between 6 inches and 4 feet, other diameters also being possible according to requirements for specific applications.

The openings which are formed are preferably quadrilateral in shape. More specifically these openings may be square or may have a parallelogram configuration. Other shaped openings are also possible but those described will result from a relatively simple type of winding and are sufficient for purposes of explanation of the invention.

In FIG. 1 the dimensions of openings 16 are indicated, by way of example, at S1 and S2. These dimensions may preferably vary between ¼ and 5 inches but greater or lesser magnitudes are also possible within the scope of the invention. Similarly, there is indicated the width of the fibre strips 10 and 12 such width being indicated at W and also generally lying within the range of ¼ and 5 inches with other dimensions outside of this range also being possible.

As will be explained in greater detail hereinafter, the openings 16 may be screened by the use of grains or granules. Such granules will be effectively held in position and prevented from passing through openings 16 during manufacture by the use of further strips 18 as indicated diagrammatically in FIG. 2. Strips 18 will be wound on the resulting pipe at a pitch angle which is substantially less than the pitch angle at which strips 10 and 12 are wound on the mandrel 14. In fact, the pitch angle of the further strip 18 will be less than half the pitch angle of the strips 10 and 12. Furthermore, the strip 18 while being a resin-bonded fibrous bundle will be resin-starved or resin-poor contrasted to the resin-rich quality of strips 10 and 12. The reason for this is that when the strips 10 and 12 have been formed it will be desired to avoid obturating the openings 16 formed therebetween by minimizing the amount of resin employed in strip 18. The strip 18 will therefore be fabricated with a resin content generally lying within the range of 15 to 23% by weight and preferably with a weight of resin in the order of magnitude of 18–19% compared to the total laminate or resin-bonded bundle. The width H of the strip 18 will preferably lie in a range of ⅛ to 178 inch with greater or lesser dimensions being possible. The gap between the strips is indicated at G and preferably will be in the order of magnitude of 1/32 to ½ of an inch.

Figure 3:
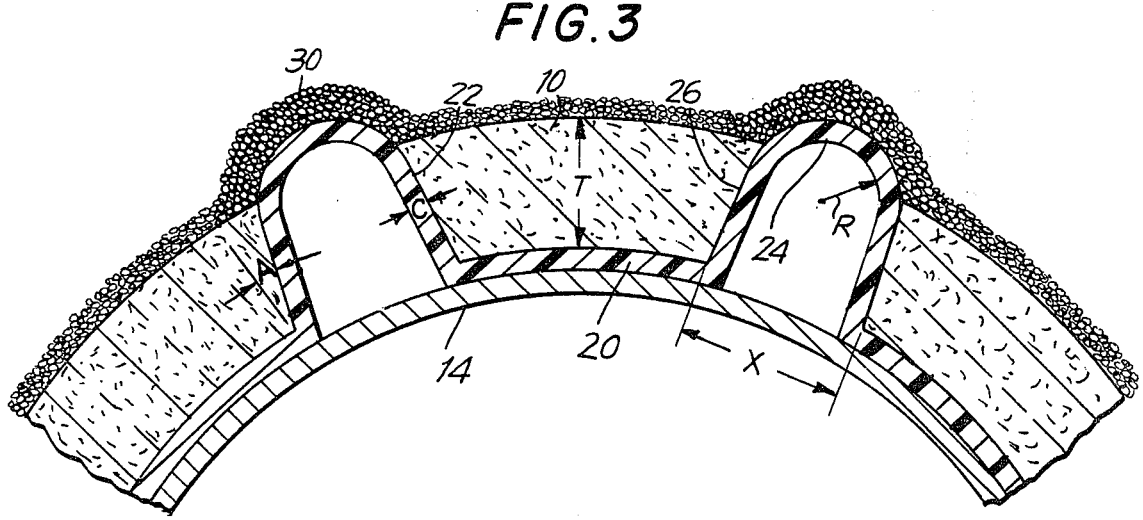
FIG. 3 is a diagrammatical sectional view illustrating a mandrel with an overlying sheet having protrusions enabling the formation of a perforated pipe with a screening provided over holes therein according to one embodiment.

Reference next to FIG. 3 will show how the invention allows the employing of resin-rich fibres without obturating the desired openings thereby enabling the obtaining of a perforated pipe product which is relatively strong while being nevertheless provided with the necessary openings therein for the entry of water and other such fluids.

More specificaly, in FIG. 3 is illustrated in diagrammatic section the mandrel 14 with, for example, the strips 10 thereupon. It will be seen that superposed on the mandrel 14 is a base 20. This base 20 may be prepared in the form of a tube or cylinder encircling the cylinder constituting the mandrel 14. Alternatively, and at this stage preferably, the base 20 is formed of sheeting which is wrapped around the mandrel 14 and maintained by any suitable means such as a strap or belt or the like. Extending radially from the base 20 are a plurality of protrusions 22. These protrusions are accommodated in the openings 16 formed by strips 10 and 12 and in fact guide the depositing of these strips in order to form the openings 16. With the protrusions 22 extending through each of the openings 16, it is possible to use a resin-rich fibrous bundle without fear of surplus resin occupying the openings 16 and clogging the same.

The base 20 with protrusions 22 thereupon may be made of any number of suitable materials, such as, for example, polyethylene, polypropylene, or fiber glass reinforced with epoxy or polyethylene or the like. The sheeting which is employed may be in the order of 1/32 to ⅛ inch thickness but other suitable dimensions may be employed. The thickness of the strip 10 which is also representative of the thickness of strips 12 is indicated at T in FIG. 3, this dimension preferably lying within the range of ¼ to 2 inches although greater or lesser dimensions are also possible within the scope of the invention. The thickness of the base 20 is also the thickness of the walls of protrusions 22, this being indicated at C, the range of which is indicated at 1/32 to ⅛ of an inch with other dimensions being possible.

The protrusions 22 are preferably vaulted as indicated by domes 24. These domes may have a continuous radius or a varying radius but should merge smoothly into the side walls 26 of the protrusions. A radius range R of ½ to 5 inches is preferable according to the size of openings 16 but other dimensions are also possible within the scope of the invention.

The protrusions 22 are preferably tapered and preferably have an angle of taper as indicated at A, this angle lying generally within the range of 1° to 45° but preferably lying within the narrower range of 5° to 20°. The withdrawal of the protrusions 22, by reason of the taper indicated by angle A, is greatly facilitated along with the withdrawal of the base 20. When the base 20 is formed of sheet wrapped around the mandrel 14, the withdrawal is a relatively simple matter. Mandrel 14 is withdrawn, whereupon the base 20 is pressed inwardly, as is allowed by the lack of continuity of its periphery, and protrusions 22 are withdrawn from the thusly formed openings 16 after curing of the resin. When the base 20 is, however, a continuous cylinder or tube, the withdrawal of the protrusions 22 from the associated openings 16 involves a more complicated procedure whereby the tube 20 and mandrel 14 are brought to different temperatures to enable the insertion of the mandrel 14 into the tube 20 and are likewise brought to different temperatures to permit their separation after the perforated pipe has been formed. It is also necessary in these circumstances that the tube 20 be of sufficiently thin plastic material as to enable deformation of the tube 20 whereupon the protrusions 22 may be withdrawn from the pipe which has been formed thereon.

The openings 16 formed as indicated above by the utilization of resin-rich fibre bundles may be of a size as to undesirably admit sand particles and the like to enter within the lumen of the perforated pipe thusly formed. The size of particles which are permitted entry may be desirably and severely curtailed by placing a screening over the various openings. One such type of screening is indicated at 30 in the form of multiple grains or granules bonded together with a minimal amount of resin. The use of granules in this fashion and for this purpose is already known and to this end it is sufficient to indicate that the granules are preferably uniform round grains of 30-2 mesh (1/32-½ inches) preferably of sand or the like wherein there is employed 2 to 5% by volume of resin. This amount of resin is insufficient to fill all of the spaces between the grains. This maintains a continuity of passages capable of admitting the permeating of water or other such fluids through the openings 16 into the interior or lumen of the perforated pipe thusly formed. The improvement of the invention however is the formation of these screens 30 in the form of domes or vaults in turn provided for by the utilization of domed protrusions 22 as indicated at 24. The purpose of these arched or vaulted screens is to increase the surface area and the volume of screening through which the entering water or other such fluid must flow. As a consequence, a much superior type of screening is obtained and a much more efficient stripping from the fluid of undesired solid particles results. Thus the invention contemplates the utilization of resin-starved granules in domed or vaulted form, in order to provide a superior filtering to the type of filtering heretofore available including the use of wire screening. It is to be noted, however, that while this represents a distinct improvement, the use of wire screening is not excluded by the invention which is basically directed towards the obtaining of a plastic bonded wound fibre strip perforated pipe of superior strength.

Figure 2:
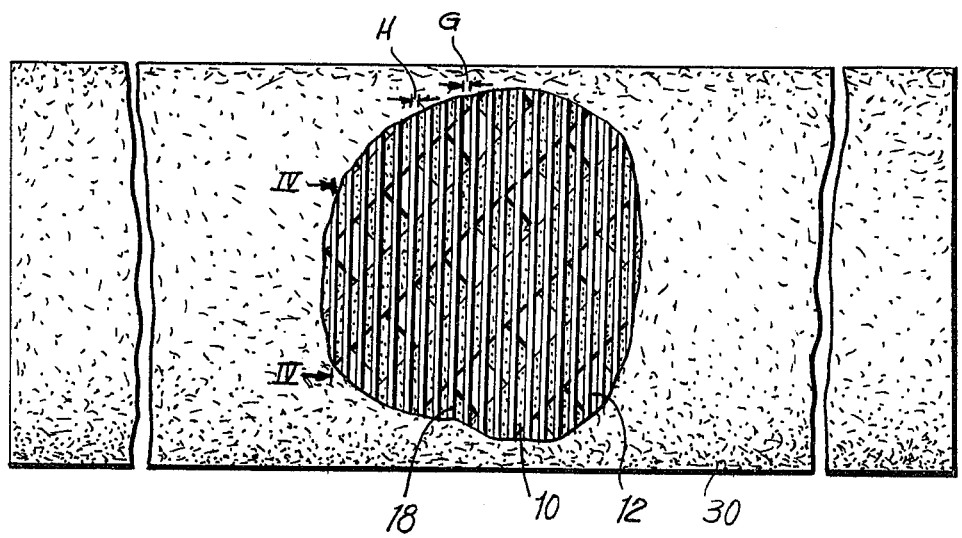
FIG. 2 illustrates a second phase of preparation with an additional strip wound onto the pipe beneath granular screening which is partially broken away to illustrate the additional strip.
Figure 4:
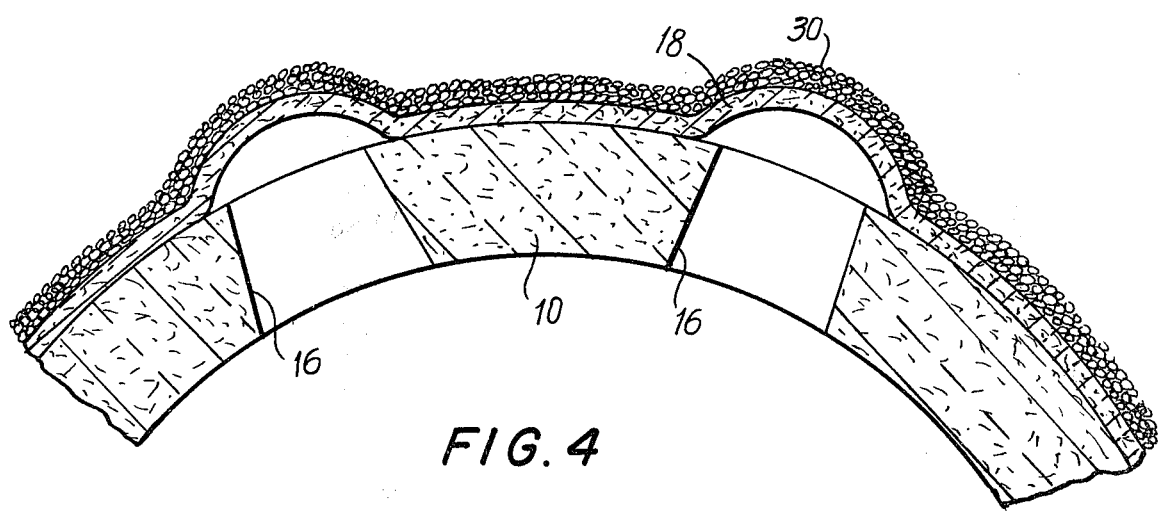
FIG. 4 illustrates the pipe with the protrusions removed and with the further strip wound thereupon in correspondence with a section along line IV—IV in FIG. 2.

To avoid the passage of the granular screening through the openings 16, the invention proposed the utilization of further strip 18 noted hereinabove with respect to FIG. 2. This strip 18 while adding to the strength of the perforated pipe which is formed has the further effect of preventing displacement of the screening 30 by partially obturating openings 16. As noted above, the strip 18 is formed of fiber glass of the same type as are strips 10 and 12 but in the case of strip 18 a resin-starved or resin-poor construction is employed to avoid obturating the openings 16 for the reasons given hereinabove.

From what has been stated it will now be obvious that the invention provides a method of forming perforated pipe which comprises winding on a mandrel having multiple spaced protrusions thereon, fibres forming angularly related strips arranged between the protrusions, said strips cooperatively defining openings through which the protrusions extend, and impregnating the fibres with a settable plastic such as epoxy resin or the like, which combined with the fibres forms a tube adequate to resist a pressure of the order of magnitude of at least about 600 p.s.i. The strips 10 and 12 are preferably arranged in two sets of parallel strips, the strips of one set being angularly related to the strips of the other set to form the quadrilateral shaped openings. The protrusions are formed with a taper to permit the ready withdrawal thereof. Screening is provided and is held in place by a further strip having a pitch angle substantially less than that of the basic strips. The screening and the further strip are provided with a resin-poor construction.

The product of the invention constitutes a perforated pipe comprising sets of strips arranged in crossing relationship and combining to form the wall of a cylinder, the strips defining openings through the wall and being of fibres and plastic with the plastic constituting about 23-50% by weight of the strips. The pipes of the invention are formed by the method disclosed hereinabove.

Figure 5:
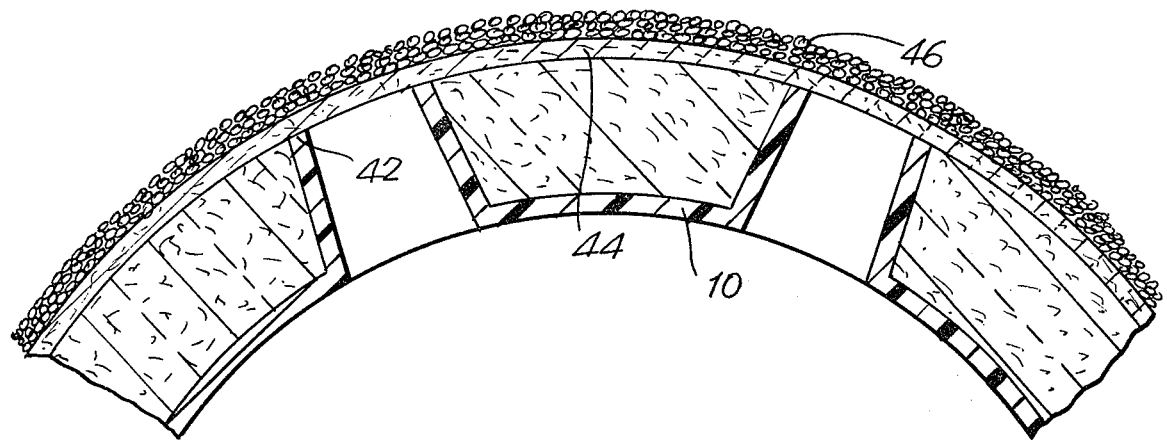
FIG. 5 illustrates a section corresponding to that of FIG. 4 according to another embodiment.

FIG. 5 illustrates that the projection bearing member may be retained in and made integral with the resulting pipe which may be made of fibre glass. This figure also shows that the projections may also be flat topped as seen at 42. Further, the figure shows that a screening 44 can be employed beneath the granular screening 46. Screening 44 may, for example, be fiber glass window screening.

Figure 6:
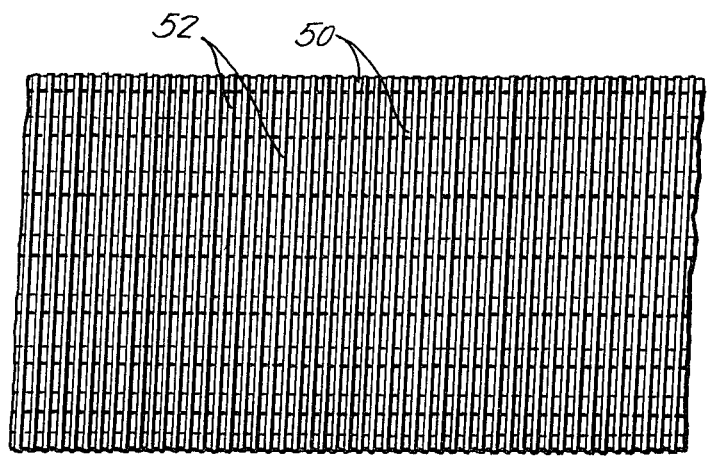
FIG. 6 diagrammatically illustrates a further embodiment.

FIG. 6 shows diagrammatically that openings can be formed by longitudinally aligned strips 50 around which is coiled one or more strips 52 having a relatively slight pitch angle and being almost perpendicularly related to strips 50.

There will now be obvious to those skilled in the art, many modifications and variations of the methods and structures set forth hereinabove. These modifications and variations will not depart from the scope of the invention as defined by the following claims or if essentially equivalent thereto.

What is claimed is:

1. A method of forming perforated pipe comprising winding, on a mandrel having multiple spaced protrusions thereon, fibers forming angularly related strips arranged between the said protrusions, said strips cooperatively defining openings through which said protrusions extend, and impregnating said fibres with a settable plastic which combined with the fibres forms a tube adequate to resist a pressure of the order of magnitude of at least about 600 p.s.i., the strips being arranged in two sets, the strips of one set being angularly related to the strips of the other set, said plastic being selected from the group consisting of epoxy resin, polyesters and vinyl esters, the fibres being of fibre glass, 23-50% of the total combined weight of the plastic and fibres being constituted by the weight of the plastic, said method furthermore comprising arranging screening over the openings, and forming at least part of the screening of grains which are stuck together with resin applied in an amount insufficient to fill all of the spaces between the grains, said method further comprising coiling a further strip around the tube beneath the screening thereon to prevent the screening from passing into the openings.

2. A method as claimed in claim 1 wherein the further strip is formed with resin-poor fibre.

3. A method as claimed in claim 2 wherein the further strip is formed with fibre glass and is about ⅛-½" wide.

4. A method as claimed in claim 2 comprising forming the further strip with 15-23% resin by weight.

5. A method as claimed in claim 1 wherein the pitch angle of said further strip is substantially less than that of the first said strips.

6. A method of forming perforated pipe comprising winding, on a mandrel having multiple spaced protrusions thereon, fibres forming angularly related strips arranged between the said protrusion, said strips cooperatively defining openings through which said protrusions extend, and impregnating said fibres with a settable plastic which combined with the fibres forms a tube adequate to resist a pressure of the order of magnitude of at least about 600 p.s.i., the strips being arranged in two sets, the strips of one set being angularly related to the strips of the other set, said plastic being selected from the group consisting of epoxy resin, polyesters and vinyl esters, the fibres being of fibre glass, 23-50% of the total combined weight of the plastic and fibres being constituted by weight of the plastic, said method furthermore comprising arranging screening over the openings, and forming at least part of the screening of grains which are stuck together with resin applied in an amount insufficient to fill all of the spaces between the grains, the strips of one set being at least substantially longitudinally arranged along the pipe, the other set being coiled around the pipe.

7. A method of forming perforated pipe comprising winding, on a mandrel having multiple spaced protrusions thereon, fibres forming angularly related strips arranged between the said protrusions, said strips cooperatively defining openings through which said protrusions extend, and impregnating said fibres with a settable plastic which combined with the fibres forms a tube adequate to resist a pressure of the order of magnitude of at least about 600 p.s.i., the strips being arranged in two sets, the strips of one set being angularly related to the strips of the other set, said plastic being selected from the group consisting of epoxy resin polyesters and vinyl esters, the fibres being of fibre glass, 23-50% of the total combined weight of the plastic and fibres being constituted by the weight of the plastic, said method furthermore comprising arranging screening over the openings, and forming at least part of the screening of grains which are stuck together with resin applied in an amount insufficient to fill all of the spaces between the grains, said method further comprising placing a supplemental fiberglass screening under the screening of grains.

8. A perforated pipe comprising sets of strips arranged in crossing relation and combining to form a wall of a cylinder, the strips defining openings through said wall, said strips being of fibres and plastic with the plastic constituting about 23–50% by weight of the strips, screening covering said openings and a further strip coiled around said cylinder beneath and supporting the screening thereon, the screening being dome shaped over said openings.

9. A pipe as claimed in claim 8 wherein the screening is at least partly formed of grains.

10. A pipe as claimed in claim 8 wherein the wall is about ¼–2″ in thickness.

11. A pipe as claimed in claim 9 comprising resin holding the grains together with channels formed therebetween.

12. A pipe as claimed in claim 1 wherein said further strip is formed of fibres and about 15–23% of resin by weight.

13. A pipe as claimed in claim 11 wherein the resin is present in insufficient amount to fill all of said channels.

14. A pipe as claimed in claim 9 wherein the screening includes a fiber glass screen under the screening of grains.

* * * * *